United States Patent [19]
Chung

[11] Patent Number: 5,881,314
[45] Date of Patent: Mar. 9, 1999

[54] MEMORY CONTROL CIRCUIT AND METHOD FOR A CD-ROM DRIVING SYSTEM

[75] Inventor: Sung-hyun Chung, Suwon, Rep. of Korea

[73] Assignee: Samsung Electronics Co., Ltd., Kyungki-do, Rep. of Korea

[21] Appl. No.: 721,582

[22] Filed: Sep. 25, 1996

[30] Foreign Application Priority Data

Oct. 30, 1995 [KR] Rep. of Korea ................. 95-38241

[51] Int. Cl.[6] ........................................... G11B 20/18
[52] U.S. Cl. ........................................ 395/864; 395/862
[58] Field of Search ................................. 395/296, 862, 395/864, 860, 298, 855, 859, 872, 386, 885, 729; 371/40.14; 711/151, 115

[56] References Cited

U.S. PATENT DOCUMENTS

| | | | |
|---|---|---|---|
| 4,001,784 | 1/1977 | Bardotti | 395/862 |
| 5,218,702 | 6/1993 | Kirtland | 395/298 |
| 5,345,574 | 9/1994 | Sakurada et al. | 711/115 |
| 5,499,252 | 3/1996 | Watanabe | 371/40.14 |
| 5,530,838 | 6/1996 | Hisano | 711/151 |
| 5,581,791 | 12/1996 | Ludwig et al. | 395/860 |
| 5,603,061 | 2/1997 | Hilley et al. | 395/864 |
| 5,689,656 | 11/1997 | Baden et al. | 395/296 |
| 5,717,894 | 2/1998 | Vivio | 395/855 |

*Primary Examiner*—Parshotam S. Lall
*Assistant Examiner*—Khanh Quang Dinh
*Attorney, Agent, or Firm*—Sughrue, Mion, Zinn, Macpeak & Seas, PLLC

[57] ABSTRACT

A memory control circuit in a CD-ROM driving system is provided which controls the writing and reading of data to and from a memory in accordance with a plurality of data operations. The circuit contains a plurality of requesters, a priority level determiner, and a memory control signal generator. The requesters correspond to the plurality of data operations and respectively generate request signals. Furthermore, the requesters respectively generate physical addresses of the memory which are respectively accessed during the data operations. The priority level determiner determines the priority levels of the request signals and outputs a selection signal based on the request signals and the priority levels. Moreover, the selection signal identifies one of the data operations as a selected data operation. The memory control signal generator generates a memory control signal and a memory address which corresponds to one of the physical addresses to be accessed during the selected data operation. As a result of the above-configuration, a request to transmit data from the memory to a high-speed host computer can be quickly satisfied, and thus, the efficiency of the host computer can be maintained. Also, a method which is performed by the memory control circuit is provided.

30 Claims, 5 Drawing Sheets

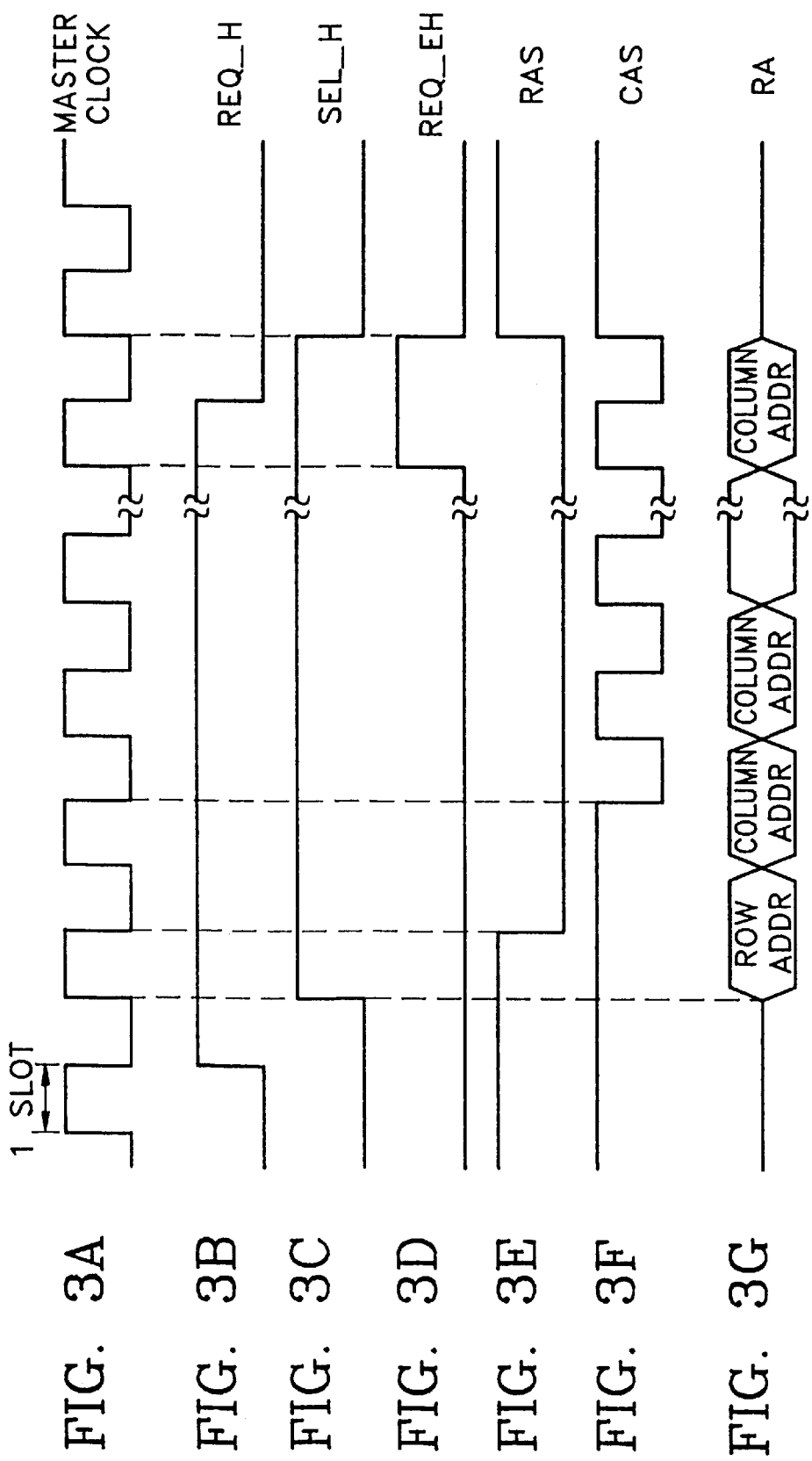

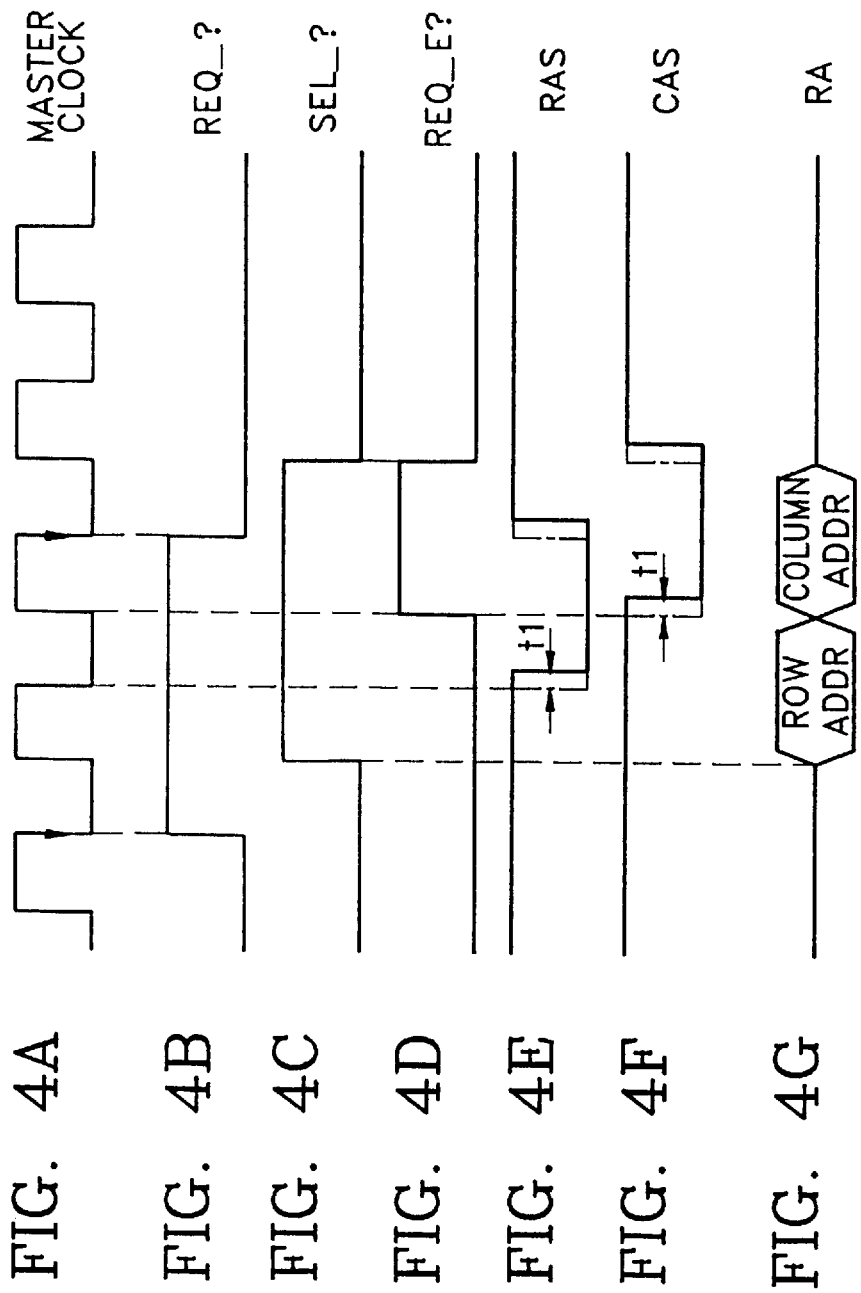

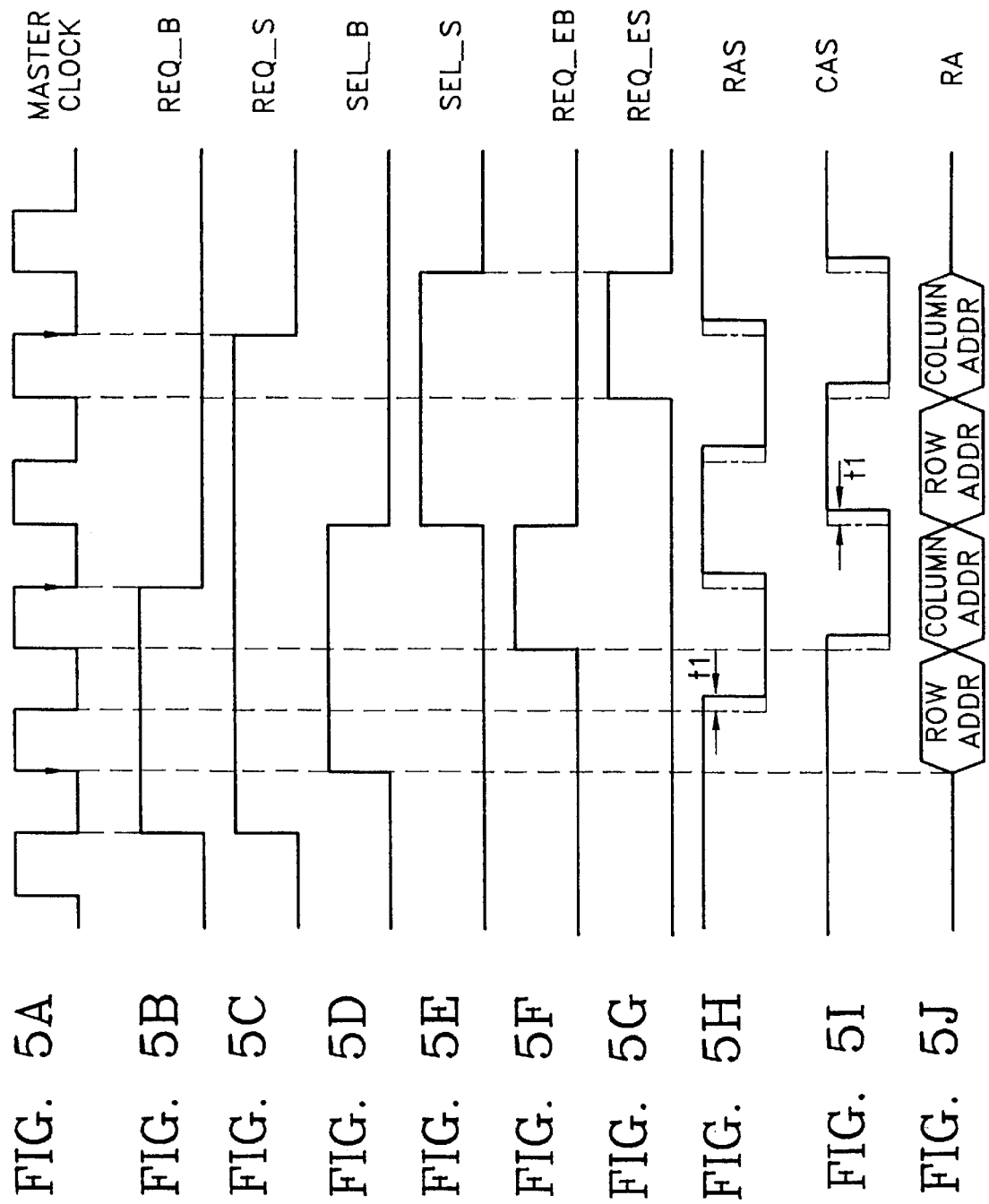

MEMORY CONTROL CIRCUIT AND METHOD FOR A CD-ROM DRIVING SYSTEM

RELATED APPLICATIONS

The present application is based on Korean Patent Application No. 38241/1995 which is incorporated herein by reference for all purposes.

FIELD OF THE INVENTION

The present invention relates to a memory control circuit and a memory control method which are used in a compact disk read-only memory (CD-ROM) driving system. More particularly, the present invention relates to a memory control circuit and method which are capable of prioritizing a request from a plurality of devices. Furthermore, the present invention relates to a circuit and a method which are capable of quickly responding to a data transmission request from a high-speed host computer.

BACKGROUND OF THE INVENTION

A memory in a conventional CD-ROM driving system is typically used in three types of data processing operations. Specifically, the memory may be used to buffer or store data reproduced from a compact disk, may be used during the execution of error-correction operations to correct errors in the stored data, and may be used to transmit data to a host computer.

In order to ensure that the memory is available to perform the above data processing operations, a predetermined time period is divided into several memory time slots, and one of the memory time slots is assigned to each of the operations. In other words, during a particular memory time slot, the memory is available to perform the data processing operation assigned to such time slot.

However, the conventional driving system has several disadvantages. For example, often a high-speed computer is connected to the CD-ROM driving system as the host computer, and thus, the host computer can perform many operations during the time period defined by one of the memory time slots. Accordingly, if the host computer requests use of the memory during a time slot which is not assigned to host transmission operations, the host computer must wait a relatively long period of time until a memory time slot that is assigned to a host transmission operation begins. As a result, the system cannot immediately comply with the host computer's request and thus, makes the host computer inefficient.

SUMMARY OF THE INVENTION

It is therefore an object of the present invention to provide a control circuit of a memory in a CD-ROM driving system, whereby data stored in a memory can be transmitted to a high-speed host computer, immediately upon receiving a request from the host.

It is another object of the present invention to provide a control circuit of a memory in a CD-ROM driving system, for enabling a memory to be shared for various functions while responding to a high-speed host computer.

It is still another object of the present invention to provide a method for controlling a memory in a CD-ROM driving system, for enabling a memory to be shared for various functions while responding to a high-speed host computer.

In order to achieve the above objects, a memory control circuit in a CD-ROM driving system for controlling data to be written to and read from a memory in accordance with a plurality of data operations is provided. Specifically, the control circuit comprises: a plurality of requesters corresponding to said plurality of data operations, wherein said requesters respectively generate request signals and respectively generate physical addresses of said memory which are respectively accessed during said data operations; priority level determining means for determining priority levels of said request signals and for outputting a selection signal based on said request signals and said priority levels, and wherein said selection signal identifies one of said data operations as a selected data operation; and generating means for generating a memory control signal and for generating a memory address which corresponds to one of said physical addresses to be accessed during said selected data operation.

In order to further achieve the above objects, a CD-ROM system is provided which comprises: a pick-up device for obtaining input data from a disk; a first digital signal processor for obtaining subcode data and CD-ROM data from said input data and processing said subcode data and said CD-ROM data to produce processed subcode data and processed CD-ROM data; a second digital signal processor for decoding said processed CD-ROM data to produce decoded CD-ROM data and for error-correcting said decoded CD-ROM data to produce corrected CD-ROM data; a memory having a plurality of memory data blocks for writing and reading data during multiplexed time slots in accordance with a plurality of data operations; a host interface for transmitting said corrected CD-ROM data to an external host; a microcomputer for outputting a plurality of block starting addresses which respectively relate to said memory data blocks; a memory control circuit, comprising: first generating means for generating request signals and physical addresses which respectively correspond to said data operations, wherein said physical addresses are respectively generated based on said block starting addresses output from said microcomputer; priority level determining means for determining priority levels of said request signals and outputting a selection signal based on said priority levels and said request signals, wherein said selection signal identifies one of said data operations as a selected data operation; and second generating means for generating a memory control signal to assign at least one of said time slots to said selected data operation and for generating a memory address which corresponds to one of said physical addresses to be accessed during said selected data operation.

In order to additionally achieve the above objects, a memory control method in a CD-ROM driving system for controlling data to be written to and read from a memory in accordance with a plurality of data operations is provided. In particular, the method comprises the steps of: (a) generating request signals and physical addresses which respectively correspond to said data operations, wherein said request signals request use of said memory to perform said data operations, respectively; (b) determining priority levels of said request signals when at least two of said request signals are generated in said step (a); (c) generating a selection signal based on said request signals and said priority levels, wherein said selection signal identifies one of said data operations as a selected data operation; (d) generating a memory control signal based on said selection signal in order to enable said memory to be accessed during said selected data operation; and (e) generating a memory address, wherein said memory address corresponds to one of said physical addresses that relates to said selected data operation.

BRIEF DESCRIPTION OF THE DRAWINGS

The above objects and advantages of the present invention will become more apparent by describing in detail preferred embodiments thereof with reference to the attached drawings in which:

FIG. 3A is a timing diagram showing a master clock during a host transmission operation;

FIG. 3B is a timing diagram showing a host request signal during a host transmission operation;

FIG. 3C is a timing diagram showing a host selection signal during a host transmission operation;

FIG. 3D is a timing diagram showing a host selection completed signal during a host transmission operation;

FIG. 3E is a timing diagram showing a row address select signal during a host transmission operation;

FIG. 3F is a timing diagram showing a column address select signal during a host transmission operation;

FIG. 3G is a timing diagram showing a RAM address signal during a host transmission operation;

FIG. 4A is a timing diagram showing a master clock during a non-host transmission operation;

FIG. 4B is a timing diagram showing a request signal during a non-host transmission operation;

FIG. 4C is a timing diagram showing a selection signal during a non-host transmission operation;

FIG. 4D is a timing diagram showing a selection completed signal during a non-host transmission operation;

FIG. 4E is a timing diagram showing a row address select signal during a non-host transmission operation;

FIG. 4F is a timing diagram showing a column address select signal during a non-host transmission operation;

FIG. 4G is a timing diagram showing a RAM address signal during a non-host transmission operation;

FIG. 5A is a timing diagram showing a master clock when two request signals are simultaneously generated;

FIG. 5B is a timing diagram showing a buffering request signal when two request signals are simultaneously generated;

FIG. 5C is a timing diagram showing a subcode request signal when two request signals are simultaneously generated;

FIG. 5D is a timing diagram showing a buffering selection signal when two request signals are simultaneously generated;

FIG. 5E is a timing diagram showing a subcode selection signal when two request signals are simultaneously generated;

FIG. 5F is a timing diagram showing a buffering completed signal when two request signals are simultaneously generated;

FIG. 5G is a timing diagram showing a subcode completed signal when two request signals are simultaneously generated;

FIG. 5H is a timing diagram showing a row address select signal when two request signals are simultaneously generated;

FIG. 5I is a timing diagram showing a column address select signal when two request signals are simultaneously generated; and FIG. 5J is a timing diagram showing a RAM address signal when two request signals are simultaneously generated.

DETAILED DESCRIPTION OF THE INVENTION

The following description of the preferred embodiments discloses specific configurations and components. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various features and structures of the present invention which would be known to one skilled in the art are omitted for the sake of clarity and brevity.

Figure 1:
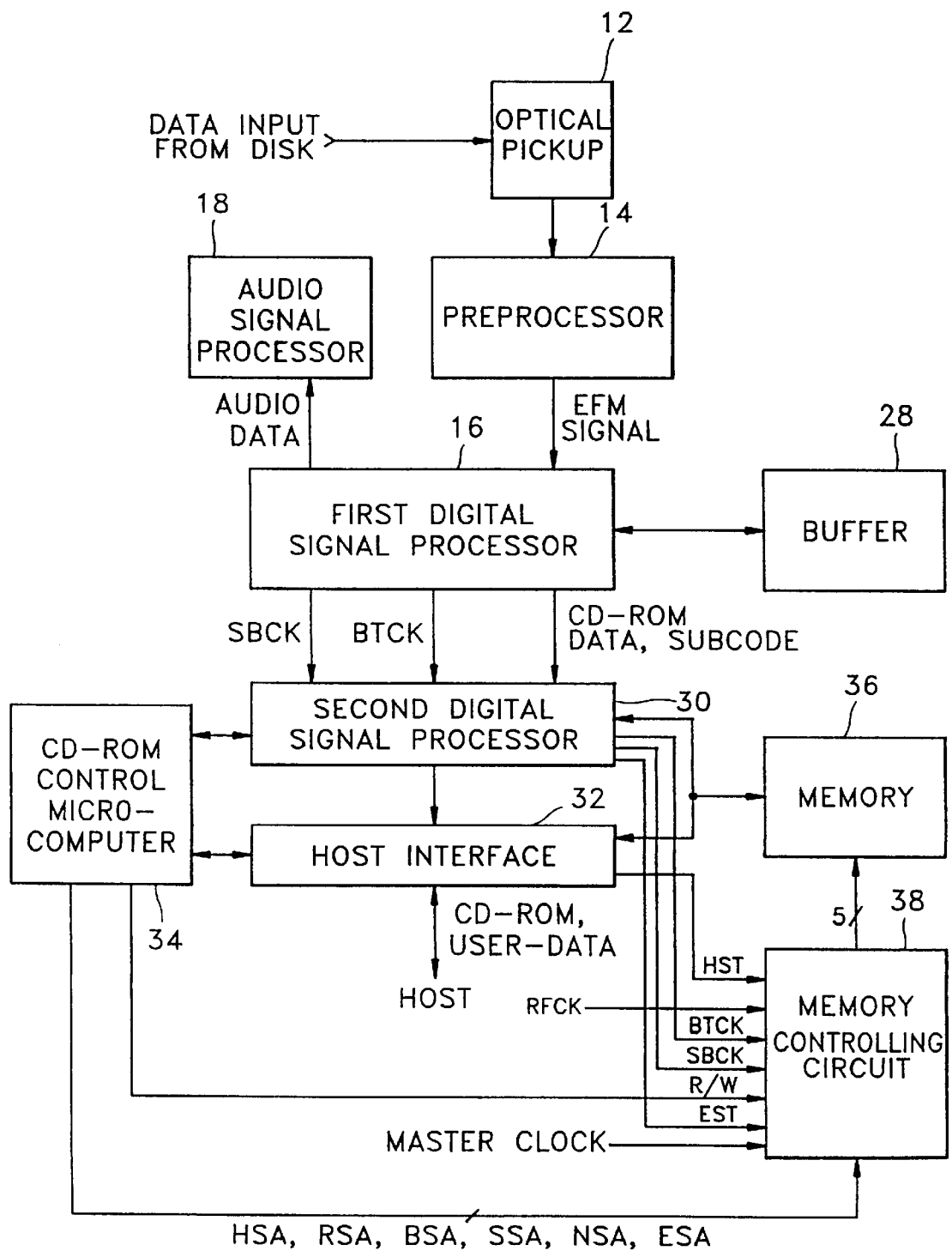
FIG. 1 is a diagram of a CD-ROM driving system in accordance with one embodiment of the present invention.

FIG. 1 is a diagram of a CD-ROM driving system in accordance with one embodiment of the present invention. In particular, the system comprises an optical pickup 12, a preprocessor 14, a first signal digital processor 16, an audio signal processor 18, a buffer 28, a second digital signal processor 30, a host interface 32, a CD-ROM control microcomputer 34 for controlling the processor 30 and the host interface 32, a memory 36, and a memory controlling circuit 38.

The optical pickup 12 reads input data from an optical disk (not shown) and outputs such data to the preprocessor 14. The preprocessor 14 comprises an amplifier and an equalizer which amplify and equalize the input data. Afterwards, the preprocessor 14 outputs eight-to-fourteen modulation ("EFM") coded channel data which corresponds to the input data. Specifically, the preprocessor 14 serially outputs frames of EFM coded channel data, and each frame contains 588 bits.

The first digital signal processor 16 inputs each frame of EFM coded channel data and decodes each frame to produce EFM decoded data. For example, the processor 16 may decode each frame of data by extracting synchronization signals, merging bits from the data, and converting the data into 32 bytes of CD data and eight bits of subcode data. Afterwards, the 32 bytes of CD data are stored in the buffer 28 as stored CD data, and the first digital signal processor 16 performs a Cross Interleaved Read-Solomon Code ("CIRC") error-correction operation on the stored CD data to obtain 24 bytes of corrected data.

The first digital signal processor 16 also processes frames of the subcode data, and each frame of subcode data comprises 98 bytes. Accordingly, since the processor 16 extracts eight bits of subcode data from each frame of EFM coded channel data, the processor 16 may extract eight bits of subcode data from 98 consecutive frames of EFM coded channel data in order to obtain one frame of subcode data.

Upon receiving one frame of subcode data, the processor 16 separates a two-byte subcode synchronization signal from the remaining 96 bytes of subcode data and processes the 96 bytes in accordance with a subcode clock SBCK. The 96 bytes of subcode data comprise eight subcode signals P, Q, R, S, T, U, V, and W. Furthermore, the subcode signal Q is processed separately from the other signals and comprises 98 bits. In particular, the signal Q contains a two-bit subcode synchronization signal, a four-bit audio/CD-ROM identification signal, a four-bit address, 72-bits of data, and a 16-bit cyclic redundancy code ("CRC") error detection parity.

If the 24 bytes of corrected CD data obtained by the first digital signal processor 16 corresponds to audio data, the processor 16 outputs the data to the audio signal processor 18 as twelve 16-bit words. On the other hand, if the 24 bytes of corrected CD data relate to CD-ROM data, the 24 bytes of CD-ROM data are output to the second digital signal processor 30 in accordance with a byte clock BTCK.

The second digital signal processor 30 processes the bytes of CD-ROM data in units of one block of CD-ROM data. In particular, each of the 24 bytes of CD-ROM data constitutes one frame of CD-ROM data, and 98 frames of the CD-ROM data constitutes on block of CD-ROM data. Accordingly, the processor 30 processes the CD-ROM data in block units of 2352 bytes. During the processing operation, the processor 30 determines which mode is designated by the CD-ROM data. Specifically, the processor 30 determines if the CD-ROM data corresponds to Model, Mode2-Form1, or Mode2-Form2 based on the physical format of the data. For example, a sync pattern may be detected in the first 12 bytes of 2352 byte CD-ROM block to distinguish it from among the various types of CD-ROM data.

Then, the second digital signal processor 30 descrambles and error-corrects the remaining 2340 bytes of CD-ROM data. For example, the CD-ROM data may be descrambled and stored in the memory 36 as stored CD-ROM data (i.e. a buffering operation). Subsequently, processor 30 may error-correct the stored CD-ROM data to produce 2048 bytes of corrected CD-ROM data (i.e. an error correction operation). Finally, the corrected CD-ROM data may be transmitted to a host computer or other external device (not shown) via the host interface 32 (i.e. a host transmission operation).

In addition to the buffering, error correction, and host transmission operations, the memory 36 may also be used in conjunction with other operations. For example, one or more blocks of subcode data may be output from first digital signal processor 16 via the processor 30 and stored in the memory 36 (i.e. a subcode storing operation). Also, the CD-ROM control microcomputer 34 may directly read data from and write data to the memory 36 (i.e. a microcomputer access operation). Furthermore, if the memory 36 is a DRAM, it may need to be refreshed periodically (e.g. every 512 periods of a system clock) by accessing each address location of the memory 36 (i.e. a refreshing operation).

The memory controlling circuit 38 coordinates the reading and writing of data to and from the memory 36 during each of the above operations so that the memory 36 is only accessed during one of the operations at a time. Specifically, the memory controlling circuit 38 determines the priority of the buffering operation, the error correction operation, the host transmission operation, the subcode storing operation, the microcomputer access operation, and refreshing operation. Then, the circuit 38 determines whether or not a particular operation will be given immediate or continued access to the memory 36 based on its priority. Accordingly, if the host transmission operation is assigned the highest priority, the memory controlling unit 38 may provide immediate access to the memory 36 during such operation, and thus, the entire system is capable of quickly responding to commands from the host computer.

Figure 2:
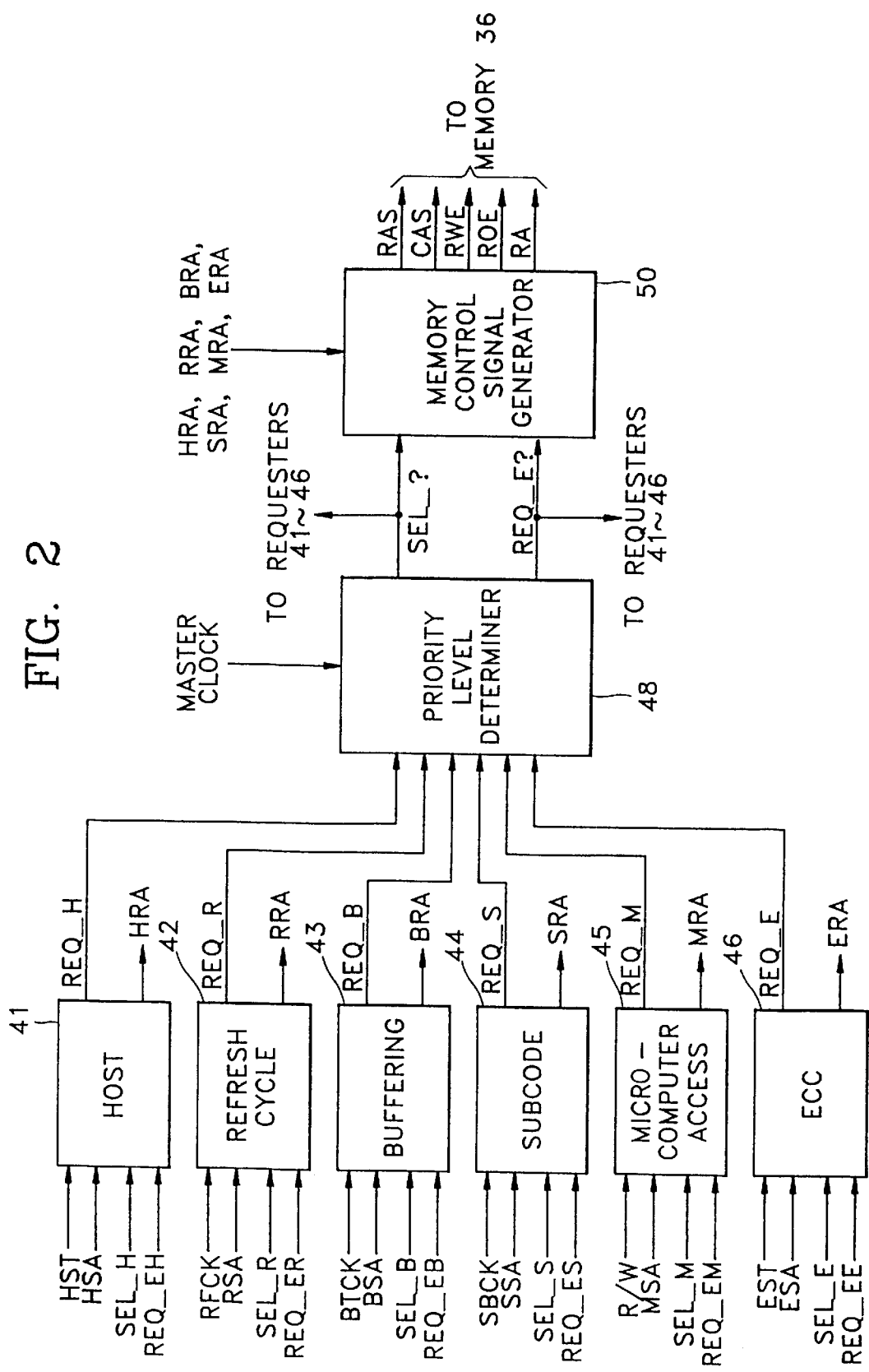
FIG. 2 is a detailed diagram of the memory controlling circuit shown in FIG. 1.

An illustrative embodiment of the memory controlling circuit 38 is shown in FIG. 2. Specifically, the memory controlling circuit 38 comprises requesters 41 to 46, a priority level determiner 48, and a memory control signal generator 50.

The requesters 41 to 46 comprise a host transmission requester 41, a refresh cycle requester 42, a buffering requester 43, a subcode requester 44, a microcomputer access requester 45, and an error correction requester 46. Furthermore, the requesters 41 to 46 input control signals HST, RFCK, BTCK, SBCK, R/W, and EST and starting addresses HSA, RSA, BSA, SSA, MSA, and ESA and generate corresponding memory use request signals REQ__H, REQ__R, REQ__B, REQ__S, REQ__M, and REQ__E and physical RAM addresses HRA, RRA, BRA, SRA, MRA and ERA. (In order to facilitate the subsequent description of the illustrative embodiment, the memory use request signals REQ__H, REQ__R, REQ__B, REQ__S, REQ__M, and REQ__E may be generally identified with the designator "REQ__?").

The priority level determiner 48 inputs the memory use request signals REQ__? and outputs various signals based on a predetermined manner in which the host transmission operation, refreshing operation, buffering operation, subcode storing operation, microcomputer access operation, and error correction operation have been prioritized. For example, the determiner 48 may output memory use selection signals SEL__H, SEL__R, SEL__B, SEL__S, SEL__M, and SEL__E and memory use selection completed signals REQ__EH, REQ__ER, REQ__EB, REQ__ES, REQ__EM and REQ__EE in accordance with a master clock signal generated by an external clock generator (not shown). (In order to facilitate the subsequent description of the illustrative embodiment, the memory use selection signals SEL__H, SEL__R, SEL__B, SEL__S, SEL__M, and SEL__E may be generally identified with the designator "SEL__?". In addition, the memory use selection completed signals REQ__EH, REQ__ER, REQ__EB, REQ__ES, REQ__EM and REQ__EE may be generally identified with the designator "REQ__E?").

The memory control signal generator 50 inputs the selection signals SEL__? and the selection completed signals REQ__E? from the determiner 48 and inputs the RAM addresses HRA, RRA, BRA, SRA, MRA, and ERA from the requesters 41 to 46. Based on such inputs, the signal generator 50 generates various addresses and control signals. For example, the signal generator 50 generates a row address select signal RAS, a column address select signal CAS, a RAM write enable signal RWE, a RAM output enable signal ROE, and a RAM address RA.

Meanwhile, the selection signals SEL__? and the selection completed signals REQ__E? perform similar functions. The selection completed signals REQ__E? have a characteristic of having shorter duration of logic high. Thus, the subcomponents (not shown) of the memory control signal generator 50 or other parts of the system may use either of the signals which is suitable.

A more detailed description of the memory controlling circuit 38 will be described below in conjunction with FIGS. 1 and 2.

A block of data is transferred from the memory 36 to the external host computer (not shown) by performing the host transmission operation. In order to perform such operation, the external host computer outputs an appropriate command to the host interface 32, and the interface 32 outputs the host control signal HST to the host transmission requester 41. Furthermore, the host computer outputs a command to the microcomputer 34 via the interface 32 to output the host starting address HSA to the requester 41. The starting address HSA indicates the starting address of the memory 36 from which the block of data is to be read. In response to the control signal HST and the starting address HSA, the host transmission requester 41 generates the host request signal REQ__H and the host RAM address HRA. The RAM address HRA is generated by adding an offset to the starting address HSA.

If the memory 36 is a DRAM, a refreshing operation must be performed to preserve the information stored in the memory 36. In order to perform such operation, the external clock generator (not shown) outputs a refresh clock RFCK to the refresh cycle requester 42. Also, the microcomputer 34 outputs the refresh starting address RSA to the requester 42 to indicate the starting address of a block of memory locations within the memory 36 which are to be refreshed. As a result of the clock RFCK and the starting address RSA, the refresh cycle requester 42 generates the refresh request signal REQ_R and the refresh RAM address RRA. Furthermore, the "RAS-only refresh cycle" may be used as the refresh cycle for controlling the DRAM memory 36.

The CD-ROM data which has been descrambled in the second digital processor 30 may be stored in the memory 36 by performing the buffering operation. In order to perform such operation, the processor 30 outputs a byte clock BTCK to the buffering requester 43. Furthermore, the microcomputer 34 outputs the buffering starting address BSA to the requester 43 to indicate the starting address location of the memory 36 at which the CD-ROM data is to be stored. In response to the clock BTCK and the starting address BSA, the buffering requester 43 generates the buffering request signal REQ_B and the buffering RAM address BRA. Also, as indicated above, the byte clock BTCK output from the processor 30 is also used to transfer bytes of the processed CD data from the first digital signal processor 16 to the second digital signal processor 30. Moreover, the byte clock BTCK has a period which is 24 times the period of the master clock.

Subcode data which has been detected in the first digital signal processor 16 can transmitted to the memory 36 via the second digital signal processor 30 and stored in the memory 36 by performing the subcode storing operation. In order to perform such operation, the processor 30 outputs a subcode clock SBCK to the subcode requester 44. Furthermore, the microcomputer 34 outputs the subcode starting address SSA to the requester 44 to indicate the starting address of the memory 36 at which the subcode data is to be stored. In response to the clock SBCK and the starting address SSA, the subcode requester 44 generates the subcode request signal REQ_S and the subcode RAM address SRA. Also, the subcode clock SBCK output from the processor 30 is used to transfer blocks of the subcode data from the first digital signal processor 16 to the second digital signal processor 30. In addition, the subcode clock SECK has a period which is 24 times the period of the byte clock BTCK.

The CD-ROM control microcomputer 34 is capable of directly reading data from and writing data to the memory 36 by performing the microcomputer access operation. In order to perform such operation, the microcomputer 34 outputs a read/write signal R/W and the microcomputer starting address MSA to the microcomputer access requester 45. Furthermore, the starting address MSA indicates the starting address of the memory 36 from which data is to be read or to which data is to be written. In response to the signal R/W and the starting address MSA, the requester 45 generates the microcomputer request signal REQ_M and the microcomputer RAM address MRA.

In order to read a block of CD-ROM data from the memory 36 and correct errors contained in such data, the error correction operation is performed. In order to perform such operation, the processor 30 outputs an error correction control signal EST to the error correction requester 46. Furthermore, the microcomputer 34 outputs the error correction starting address ESA to the requester 46 to designate the starting address of the memory 36 from which the CD-ROM data is to be read. As a result of the control signal EST and the starting address ESA, the subcode requester 46 generates the error correction request signal REQ_E and the error correction RAM address ERA.

When a particular requester (e.g. the buffering requester 43) generates a corresponding request signal (e.g. the buffering request signal REQ_B), the priority level determiner 48 outputs the corresponding selection signal (e.g. the buffering selection signal SEL_B). Furthermore, the determiner 48 outputs the selection signal SEL_B to requester 43 to prevent the requester 43 from further generating the request signal REQ_B. In addition, the determiner 48 outputs the corresponding selection completed signal (e.g. the buffering selection completed signal REQ_EB) at or around the time when it stops outputting the selection signal SEL_B. For example, the determiner 48 may output the completed selection signal REQ_EB within one clock period of the mater clock of when the selection signal SEL_B ceases to be output.

In addition, when two or more request signals REQ_? are generated during the same time slot (e.g. during the same pulse of the master clock), the priority level determiner 48 outputs a selection signal SEL_? and a completed signal REQ_$_{E?}$ based on the priorities of the operations which correspond to the two or more request signals REQ_?. For example, the priority of the operations performed by CD-ROM driving system may be assigned to such operations in the following order: the host transmission operation, the refreshing operation, the buffering operation, the subcode storing operation, the microcomputer access operation, and the error correction operation. In such a situation, if the host request signal REQ_H and the subcode request signal REQ_S are generated during the same time slot, the determiner 48 would output the host selection signal SEL_H and the host selection completed signal REQ_E? because the host transmission operation has a higher priority than the subcode storing operation.

Also, if two or more request signals REQ_? are simultaneously output by two or more requesters 41 to 46 and the determiner 48 selects request signal REQ_? corresponding to the operation with the higher priority, the request signal REQ_? having the lower priority will be continuously output until its related selection signal SEL_? or completed selection signal REQ_E? is output by the determiner 48. For instance, in the above example, the host request signal REQ_H and the subcode request signal REQ_S are generated in the same time slot, and the determiner 48 outputs the selection signal SEL_H because the host transmission operation has a higher priority. Furthermore, the subcode requester 44 continues to output the request signal REQ_S until the determiner 48 outputs its corresponding selection signal SEL_S or completed request signal REQ_ES.

In general, once a particular one of the requesters 41 to 46 outputs a request signal REQ_?, such signal REQ_? is continuously output until the particular one of the requesters 41 to 46 receives the corresponding selection signal SEL_? (or the selection completed signal REQ_E?). Once such signal SEL_? (or REQ_E?) is received, the particular requester stops outputting the request signal REQ_?.

Also, if a particular operation has begun executing before the current time slot and if a new request signal REQ_? is generated during the current time slot, the present embodiment may react differently depending upon which operation is already being executed. For example, the refreshing, buffering, subcode storing, and microcomputer access operations may be performed within only two time slots.

Accordingly, since the above operations can be completed quickly, the CD-ROM driving system may not interrupt such operations if a new request signal REQ__? is generated. Furthermore, even if the operation currently being performed (e.g. the subcode storing operation) has a lower priority than the operation corresponding to the new request signal REQ__? (e.g. the buffering operation), the system may be designed such that the subcode storing operation is completed before the buffering operation begins.

However, the amount of time required to perform the error correction operation may substantially exceed two time slots. Accordingly, the CD-ROM driving system may interrupt the error correction operation if it is being performed when a new request signal REQ__? is generated. Then, once the operation corresponding to the new request signal REQ__? is completed, the error correction operation may be resumed.

For example, if the subcode storing operation is currently being performed and the buffering requester 43 generates the buffering request signal REQ__B, the priority level determiner 48 waits until the subcode storing operation is completed before outputting the buffering selection signal SEL__B to the requester 43. In addition, if both the buffering request signal REQ__B and the microcomputer request signal REQ__M are generated while the subcode storing operation is executing, the priority level determiner 48 outputs the buffering selection signal SEL__B when the subcode storing operation is finished because the buffering operation has a higher priority than the microcomputer access operation.

On the other hand, if the error correction operation is currently being performed and the buffering requester 43 generates the buffering request signal REQ__B, the priority level determiner 48 suspends the error correction operation in the time slot immediately following the time slot in which the request signal REQ__B was generated. Then, when the buffering operation is completed and no other request signals REQ__? from the requesters 41, 42, 44, and 45 remain, the error correction operation is resumed.

The memory control signal generator 50 inputs the selection signals SEL__? and the selection completed signals REQ__E? from the priority level determiner 48 and inputs the RAM addresses HRA, RRA, BRA, SRA, MRA, and ERA from the requesters 41 to 46. Then, the generator 50 generates the row address select signal RAS, the column address select signal CAS, the RAM write enable signal RWE, and the RAM output enable signal ROE in accordance with the selection signals SEL__? and the selection completion signals REQ__E?. Also, the generator 50 selects a RAM address RA from among the RAM addresses HRA, RRA, BRA, SRA, MRA, and ERA.

Examples of the operation of the memory control signal generator 50 will be described below in conjunction with the timing diagrams illustrated in FIGS. 3A to 3G, FIGS. 4A to 4G, and FIGS. 5A to 5J.

FIGS. 3A to 3G represent examples of timing diagrams of various signals which are input or output by the generator 50 during the host transmission operation. Specifically, FIG. 3A shows the waveform of the master clock which may be obtained by dividing an externally generated system clock in half.

FIG. 3B shows the waveform of the host request signal REQ__H generated by the host transmission requester 41. Furthermore, since the data transmitted during the host transmission operation is transmitted in units of a page of data, the request signal REQ__H may be enabled up to an interval corresponding to one page (e.g. up to 512 master clock cycles).

FIGS. 3C and 3D illustrate waveforms of the host selection signal SEL__H and the host selection completed signal REQ__EH, respectively. Also, as shown in the figures, the selection signal SEL__H may be generated at the rising edge of the master clock that occurs after the request signal REQ__H is generated. Furthermore, the priority level determiner 48 may generate the selection completed signal REQ__EH within one clock cycle before selection signal SEL__H ends.

FIGS. 3E to 3G respectively show waveforms of the address select signals RAS and CAS and the RAM address RA generated by the memory control signal generator 50. Furthermore, as shown in FIG. 3G, the generator 50 generates the row address of the RAM address RA, and then, successively generates a series of column addresses of the address RA. The RAM address RA is generated in the above manner since the host transmission operation transfers a page of data from the memory 36.

FIGS. 4A to 4G show examples of timing diagrams of various signals which are input or output by the generator 50 when an operation besides the host transmission operation is being executed. FIG. 4A shows the waveform of the master clock, and FIG. 4B shows the request signal REQ__? generated by the refresh cycle requester 42, the buffering requester 43, the subcode requester 44, the microcomputer access requester 45, or the error correction requester 46.

FIGS. 4C and 4D respectively show waveforms of the selection signal SEL__? and the selection completed signal REQ__E? which correspond to the request signal REQ__?. In addition, as shown in the figures, the selection signal SEL__? may be generated at the rising edge of the master clock which occurs after the request signal REQ__? is generated. Moreover, the determiner 48 may generate the selection completed signal REQ__E? within one clock cycle after selection signal SEL__? ends.

FIGS. 4E to 4G respectively illustrate the waveforms of the address select signals RAS and CAS and the RAM address RA generated by the memory control signal generator 50. Also, FIGS. 4E and 4F show that the signals RAS and CAS lag the rising or falling edge of the master clock by a delay time $t_1$. Such delay time $t_1$ may be due to a set up time. As illustrated in FIG. 4G, the generator 50 generates the row address of the RAM address RA and then, generates a column address of the address RA. The RAM address RA is generated in the above manner since the operations other than the host transmission operation read data from and write data to the memory 36 in units of one word.

FIGS. 5A to 5J show examples of timing diagrams of various signals which are input or output by the generator 50 when two request signals (e.g. the buffering request signal REQ__B and the subcode request signal REQ__S) are simultaneously generated. FIG. 5A shows the waveform of the master clock, and FIGS. 5B and 5C respectively illustrate the buffering request signal REQ__B and the subcode request signal REQ__S. FIGS. 5D and 5E respectively show the buffering selection signal SEL__B and subcode selection signal SEL__S generated by the priority level determiner 48. FIGS. 5F and 5G respectively illustrate the buffering selection completed signal REQ__EB and the subcode selection completed signal REQ__ES generated by the priority level determiner 48. Finally, FIGS. 5H to 5J show the address select signals RAS and CAS and the RAM address RA generated in the memory control signal generator 50, respectively.

As illustrated in the figures, when the buffering and subcode request signals REQ__B and REQ__S are simultaneously generated, the priority level determiner 48 outputs the buffering selection signal SEL_B before the subcode selection signal SEL_S because the buffering operation has a higher priority than the subcode storing operation. Then, once the buffering operation is completed, the determiner 48 outputs the subcode selection signal SEL_S, and the subcode storing operation is performed. Thus, as indicated in FIG. 5J, the generator 50 outputs row and column addresses for the RAM address RA of the buffering operation and subsequently outputs row and column addresses for the RAM address RA of the subcode storing operation.

In the above-described embodiments, the host transmission operation is assigned the highest priority, and thus, the data can be transferred from the memory 36 to a high speed host computer without degrading the efficiency of the host computer. Furthermore, even though the error correction operation is relatively time consuming, the efficiency of the CD-ROM driving system is still maintained because the system interrupts the error correction operation when a higher priority operation needs to be performed.

Also, even though the present embodiment shows six requesters 41 to 46, additional or alternative requesters may be added if the CD-ROM driving system performs additional operations. Furthermore, even though the requesters 41 to 46 are shown as separate devices, two or more of the requesters may be combined to form a single signal generator. In addition, the CD-ROM driving system of the present invention may be operated in a four-times speed mode and can also respond to faster speed modes.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A memory control circuit in a CD-ROM driving system for controlling data to be written to and read from a memory in accordance with a plurality of data operations, comprising:

a plurality of requesters each corresponding to a respective one of said plurality of data operations, wherein said requester respectively generate request signals and respectively generate physical addresses of said memory which are respectively accessed during said data operations;

priority level determining means for determining priority levels of said request signals and for outputting a selection signal based on said request signals and said priority levels, wherein said selection signal identifies one of said data operations as a selected data operation; and generating means for generating a memory control signal based on said selection signal and for generating a memory address which corresponds to one of said physical addresses to be accessed during said selected data operation.

2. A memory control circuit as claimed in claim 1, wherein said requesters comprise:

a buffering requester which receives a buffering control signal and a buffering starting address of a buffering memory data block of said memory and which outputs a buffering request signal and a buffering physical address, wherein said buffering requester corresponds to a buffering data operation for storing CD-ROM data read from a disk in said buffering memory data block as stored CD-ROM data;

an error correction requester which receives an error correction control signal and an error correction starting address of an error correction memory data block of said memory and which generates an error request signal and an error physical address, wherein said error correction requester corresponds to an error correction data operation for reading said stored CD-ROM data from said memory and correcting errors contained in said stored CD-ROM data to produce corrected CD-ROM data, and wherein said corrected CD-ROM data is stored in said error correction memory data block; and a host transmission requester which receives a host control signal and a host starting address of a host transmission memory data block of said memory and which generates a host request signal and a host physical address, wherein said host transmission requester corresponds to a host transmission data operation for reading said corrected CD-ROM data from said memory and transmitting said corrected CD-ROM data to an external host.

3. A memory control circuit as claimed in claim 2, wherein said requesters further comprise:

a subcode requester which receives a subcode control signal and a subcode starting address of a subcode memory data block of said memory and which generates a subcode request signal and a subcode physical address, wherein said subcode requester corresponds to a subcode storing data operation for storing subcode data read from said disk in said subcode memory data block as stored subcode data; and a microcomputer access requester which receives a microcomputer control signal and a microcomputer starting address of a microcomputer memory data block of said memory and which generates a microcomputer request signal and a microcomputer physical address, wherein said microcomputer access requester corresponds to a microcomputer access operation which enables a microcomputer to directly write data to and read data from said microcomputer memory data block.

4. A memory control circuit as claimed in claim 3, wherein said requesters further comprise:

a refresh cycle requester which receives a refresh control signal and a refresh starting address of a refresh memory data block of said memory and which generates a refresh request signal and a refresh physical address, wherein said memory is a dynamic random access memory, and wherein said refresh cycle requester corresponds to a refreshing operation which accesses said refresh memory data block to preserve data stored in said refresh memory data block.

5. A memory control circuit as claimed in claim 1, wherein said priority levels comprise a first priority level and a second priority level having a priority lower than said first priority level, wherein said request signals comprise a first request signal having said first priority level and a second request signal having said second priority level, wherein, if said priority level determining means inputs said first request signal and said second request signal at about the same time, said priority level determining means outputs said selection signal corresponding to said first request signal and outputs a second selection signal corresponding to said second request signal after said selection signal has been output.

6. A memory control circuit as claimed in claim 2, wherein said priority level determining means prioritizes said request signals such that said host transmission request signal has a higher priority than said buffering request signal and such that said buffering request signal has a higher priority than said error request signal.

7. A memory control circuit as claimed in claim 4, wherein said priority level determining means prioritizes said request signals such that said host transmission request signal has a higher priority than said refreshing request signal, said refreshing request signal has a higher priority than said buffering request signal, said buffering request signal has a higher priority than said subcode request signal, said subcode request signal has a higher priority than said microprocessor request signal, and said microprocessor request signal has a higher priority than said error request signal.

8. A memory control circuit as claimed in claim 1, wherein said request signals comprise a first request signal corresponding to a first data operation and a second request signal corresponding to a second data operation, wherein, if said first data operation is currently executing as a result of said first request signal being previously input to said priority level determining means and if said second request signal is currently input to said priority level determining means, said priority level determining means outputs said selection signal in response to said second request signal after said first data operation stops executing.

9. A memory control circuit as claimed in claim 2, wherein said request signals comprise a first request signal corresponding to a first data operation and a second request signal corresponding to a second data operation, wherein, if said first data operation is currently executing as a result of said first request signal being previously input to said priority level determining means and if said second request signal is currently input to said priority level determining means, said priority level determining means outputs said selection signal in response to said second request signal after said first data operation stops executing, and wherein said first data operation is different from said error correction data operation.

10. A memory control circuit as claimed in claim 4, wherein said request signals comprise a first request signal corresponding to a first data operation and a second request signal corresponding to a second data operation, wherein, if said first data operation is currently executing as a result of said first request signal being previously input to said priority level determining means and if said second request signal is currently input to said priority level determining means, said priority level determining means outputs said selection signal in response to said second request signal after said first data operation stops executing, and wherein said first data operation is different from said error correction data operation.

11. A memory control circuit as claimed in claim 1, wherein said request signals comprise a first request signal corresponding to a first data operation and a second request signal corresponding to a second data operation, wherein, if said first data operation is currently executing as a result of said first request signal being previously input to said priority level determining means and if said second request signal is currently input to said priority level determining means, said priority level determining means pauses said first data operation and outputs said selection signal in response to said second request signal after said first data operation has been paused.

12. A memory control circuit as claimed in claim 2, wherein, if said error correction data operation is currently executing as a result of said error request signal being previously input to said priority level determining means and if another one of said request signals is currently input to said priority level determining means, said priority level determining means pauses said error correction data operation and outputs said selection signal in response to said one of said request signals after said error correction data operation has been paused.

13. A memory control circuit as claimed in claim 4, wherein, if said error correction data operation is currently executing as a result of said error request signal being previously input to said priority level determining means and if another one of said request signals is currently input to said priority level determining means, said priority level determining means pauses said error correction data operation and outputs said selection signal in response to said one of said request signals after said error correction data operation has been paused.

14. A memory control circuit as claimed in claim 1, wherein said priority level determining means outputs a selection completed signal which corresponds to a time when said priority level determining means ceases outputting said selection signal, wherein said selection signal and said selection completed signal are output to at least a particular requester, and wherein said particular requester stops generating a particular request signal upon receiving said selection signal or said selection completed signal correspond to said particular requester.

15. A CD-ROM system, comprising:

a pick-up device for obtaining input data from a disk;

a first digital signal processor for obtaining subcode data and CD-ROM data from said input data and processing said subcode data and said CD-ROM data to produce processed subcode data and processed CD-ROM data;

a second digital signal processor for decoding said processed CD-ROM data to produce decoded CD-ROM data and for error-correcting said decoded CD-ROM data to produce corrected CD-ROM data;

a memory for writing and reading a plurality of data including said processed subcode data, said decoded CD-ROM data, and said corrected CD-ROM data;

a host interface for transmitting said corrected CD-ROM data to an external host;

a microcomputer for outputting a plurality of block starting addresses which respectively relate to data operations;

a memory control circuit, comprising:

first generating means for generating request signals and physical addresses which respectively correspond to said data operations, wherein said physical addresses are respectively generated based on said block starting addresses output from said microcomputer;

priority level determining means for determining priority levels of said request signals and outputting a selection signal based on said priority levels and said request signals, wherein said selection signal identifies one of said data operations as a selected data operation; and second generating means for generating a memory control signal to assign at least one of said time slots to said selected data operation and for generating a memory address which corresponds to one of said physical addresses to be accessed during said selected data operation.

16. A CD-ROM system as claimed in claim 15, wherein said data operations comprise:

a buffering data operation for storing said decoded CD-ROM in a buffering memory data block of said memory as stored CD-ROM data;

an error correction data operation for reading said stored CD-ROM data from said memory and correcting said errors contained in said stored CD-ROM data to produce said corrected CD-ROM data, wherein said corrected CD-ROM data is stored in an error correction memory data block of said memory; and a host transmission data operation for reading said corrected CD-ROM data from said memory and transmitting said corrected CD-ROM data to said external host via said host interface.

17. A CD-ROM system as claimed in claim 16, wherein said data operations further comprise:

a subcode storing data operation for storing said subcode data in a subcode memory data block of said memory; and a microcomputer access operation for enabling said microcomputer to directly write data to and read data from a microcomputer memory data block of said memory.

18. A CD-ROM system as claimed in claim 17, wherein said memory is a dynamic random access memory, and wherein said data operations further comprise a refreshing operation for accessing a refresh memory data block in said memory to preserve data stored in said refresh memory data block.

19. A CD-ROM system as claimed in claim 16, wherein said priority level determining means prioritizes said request signals such that said host transmission data operation has a higher priority than said buffering data operation and such that said buffering data operation has a higher priority than said error correction data operation.

20. A CD-ROM system as claimed in claim 18, wherein said priority level determining means prioritizes said request signals such that said host transmission data operation has a higher priority than said refreshing data operation, said refreshing data operation has a higher priority than said buffering data operation, said buffering data operation has a higher priority than said subcode storing data operation, said subcode storing data operation has a higher priority than said microprocessor access data operation, and said microprocessor access data operation has a higher priority than said error request signal.

21. A CD-ROM system as claimed in claim 16, wherein said request signals comprise a first request signal corresponding to a first data operation and a second request signal corresponding to a second data operation, wherein, if said first data operation is currently executing as a result of said first request signal being previously input to said priority level determining means and if said second request signal is currently input to said priority level determining means, said priority level determining means outputs said selection signal in response to said second request signal after said first data operation stops executing, and wherein said first data operation is different from said error correction data operation.

22. A CD-ROM system as claimed in claim 16, wherein, if said error correction data operation is currently executing and if one of said request signals is currently input to said priority level determining means, said priority level determining means pauses said error correction data operation and outputs said selection signal in response to said one of said request signals after said error correction data operation has been paused.

23. A CD-ROM system as claimed in claim 15, wherein said priority level determining means outputs a selection completed signal which corresponds to a time when said priority level determining means ceases outputting said selection signal, wherein said selection signal and said selection completed signal are output to said first generating means, and wherein said first generating means stops generating at least a particular request signal upon receiving said selection signal or said selection completed signal.

24. A memory control method in a CD-ROM driving system for controlling data to be written to and read from a memory in accordance with a plurality of data operations, comprising the steps of:

(a) generating request signals and physical addresses which respectively correspond to said data operations, wherein said request signals request use of said memory to perform said data operations, respectively;

(b) determining priority levels of said request signals when at least two of said request signals are generated in said step (a);

(c) generating a selection signal based on said request signals and said priority levels, wherein said selection signal identifies one of said data operations as a selected data operation;

(d) generating a memory control signal based on said selection signal in order to enable said memory to be accessed during said selected data operation; and (e) generating a memory address, wherein said memory address corresponds to one of said physical addresses that relates to said selected data operation.

25. A memory control method as claimed in claim 24, wherein said data operations comprise:

a buffering data operation for storing CD-ROM data reproduced from a disk in a buffering memory data block of said memory as stored CD-ROM data;

an error correction data operation for reading said stored CD-ROM data from said memory and correcting said errors contained in said stored CD-ROM data to produce said corrected CD-ROM data, wherein said corrected CD-ROM data is stored in an error correction memory data block of said memory; and a host transmission data operation for reading said corrected CD-ROM data from said memory and transmitting said corrected CD-ROM data to an external host.

26. A memory control method as claimed in claim 25, wherein said data operations further comprise:

a subcode storing data operation for storing subcode data reproduced from said disk in a subcode memory data block of said memory; and a microcomputer access operation for enabling a microcomputer to directly write data to and read data from a microcomputer memory data block of said memory.

27. A memory control method as claimed in claim 26, wherein said memory is a dynamic random access memory, and wherein said data operations further comprise a refreshing operation for accessing a refresh memory data block in said memory to preserve data stored in said refresh memory data block.

28. A memory control method as claimed in claim 27, wherein said step (b) comprises the steps of:

(b1) prioritizing said request signals such that said host transmission data operation has a higher priority than said refreshing data operation;

(b2) prioritizing said request signals such that said refreshing data operation has a higher priority than said buffering data operation;

(b3) prioritizing said request signals such that said buffering data operation has a higher priority than said subcode storing data operation;

(4) prioritizing said request signals such that said subcode storing data operation has a higher priority than said microprocessor access data operation; and (b5) prioritizing said request signals such that said microprocessor access data operation has a higher priority than said error correction data operation.

29. A memory control method as claimed in claim 25, wherein said step (c) comprises the steps of:

(c1) detecting if one of said data operations is currently being executed, wherein said one of said data operation is not said error correction data operation;

(c2) if said one of said data operations is currently being executed, detecting if one of said request signals has been generated after said one of said data operations began executing; and (c3) if said one of said request signals has been generated after said one of said data operations began executing, outputting said selection signal in response to said one of said request signals after said one of said data operations stops executing.

30. A memory control method as claimed in claim 25, wherein said step (c) comprises the steps of:

(c1) detecting if said error correction data operation is currently executing;

(c2) if said error correction data operation is currently executing, detecting if one of said request signals has been generated;

(c3) if said one of said request signals has been generated, pausing said error correction data operation; and (c4) outputting said selection signal in response to said one of said request signals after said error correction data operation has been paused.

* * * * *